United States Patent [19]

Guertin

[11] Patent Number: 5,433,247

[45] Date of Patent: Jul. 18, 1995

[54] COAXIAL BREAKAWAY COUPLING WITH VAPOR ASSIST CHECK

[75] Inventor: Robert W. Guertin, Troy, Ohio

[73] Assignee: Catlow, Inc., Tipp City, Ohio

[21] Appl. No.: 286,507

[22] Filed: Aug. 5, 1994

[51] Int. Cl.⁶ ............................................. F16L 37/28
[52] U.S. Cl. ................................. 137/614.04; 285/2
[58] Field of Search .................. 137/614.03, 614.04; 285/2

[56] References Cited

U.S. PATENT DOCUMENTS

| | | | |
|---|---|---|---|
| 3,211,178 | 10/1965 | Kiszko | 137/614.04 |
| 3,570,543 | 3/1971 | Ehman | 137/614.04 X |
| 4,655,462 | 4/1987 | Balsells | |
| 4,763,683 | 8/1988 | Carmack | |
| 4,827,960 | 5/1989 | Nitzberg et al. | |
| 5,135,029 | 8/1992 | Anderson et al. | |
| 5,255,723 | 6/1993 | Carmack et al. | |
| 5,365,973 | 11/1994 | Fink, Jr. et al. | 137/614.04 |

OTHER PUBLICATIONS

"Cleaning Up" With Richard's Vacuum-Assist RE-SNAP Safe-T-Gards Richards Industries, Inc.

Husky Reconnectable Safe-T-Break TM Stops Vapor Flow, Cuts Nuisance Breaks Husky Corporation 1992.

Primary Examiner—John C. Fox
Attorney, Agent, or Firm—Jacox & Meckstroth

[57] ABSTRACT

A coaxial breakaway coupling and a coaxial hose connect a fuel dispensing pump to a coaxial fuel dispensing nozzle, and the coupling includes first and second tubular valve bodies releasably coupled together by an annular canted coil spring. Each valve body supports therein an axially movable tubular valve member for defining an inner vapor return passage and an outer fuel supply passage, and a vapor return check valve member is supported for axial movement within the vapor return passage upstream of an annular valve seat. All of the valve members are spring biased towards closed positions and move to open positions when the valve bodies are coupled together. When the valve bodies are uncoupled or separate in response to an axial breakaway force, the valve members close, and suction from a vacuum pump connected to the vapor return passage pulls the check valve member towards it closed position against the valve seat. In a modification, the breakaway coupling is integrated with a 45° coaxial swivel coupling connected to a coaxial fuel dispensing nozzle.

15 Claims, 2 Drawing Sheets

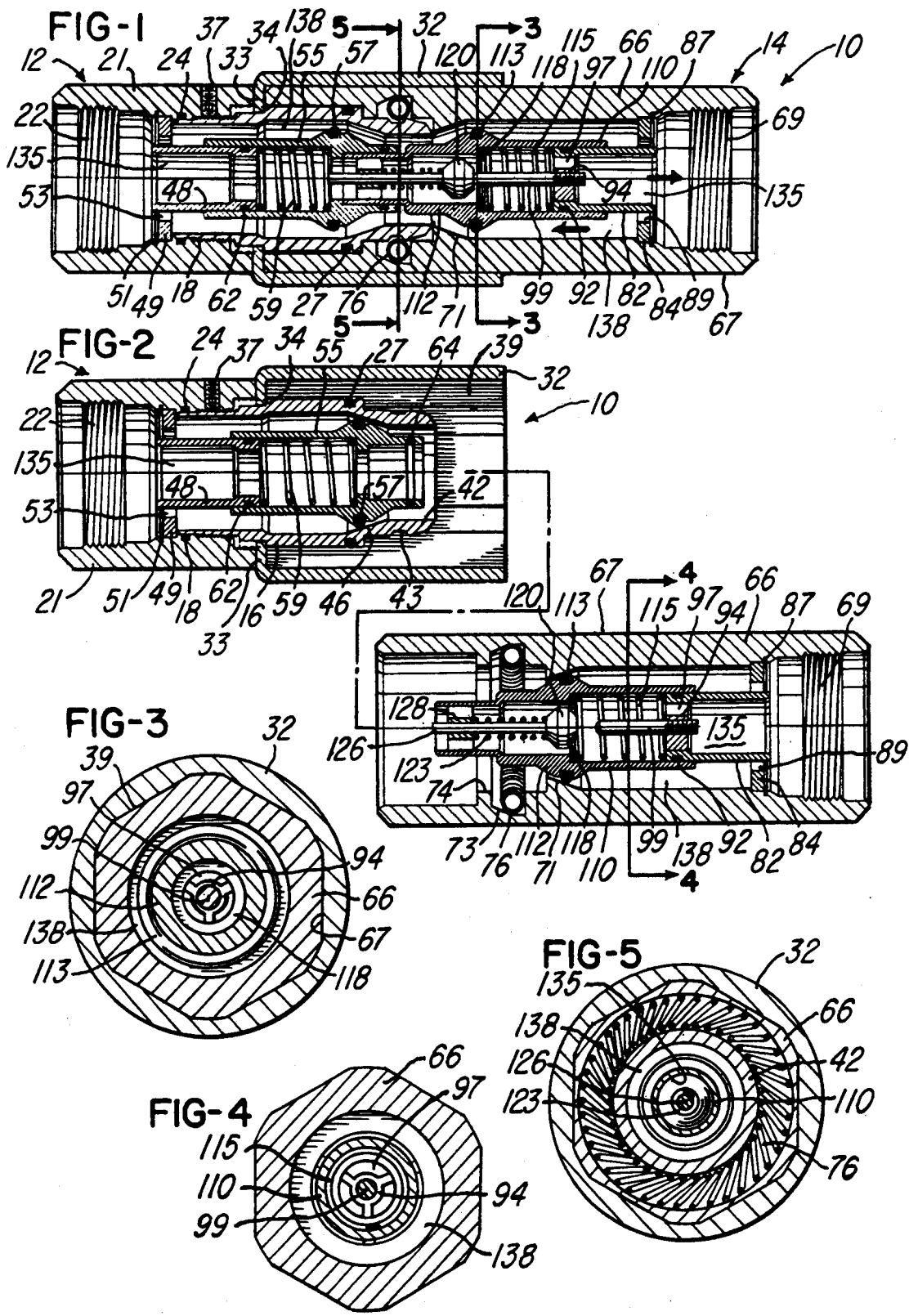

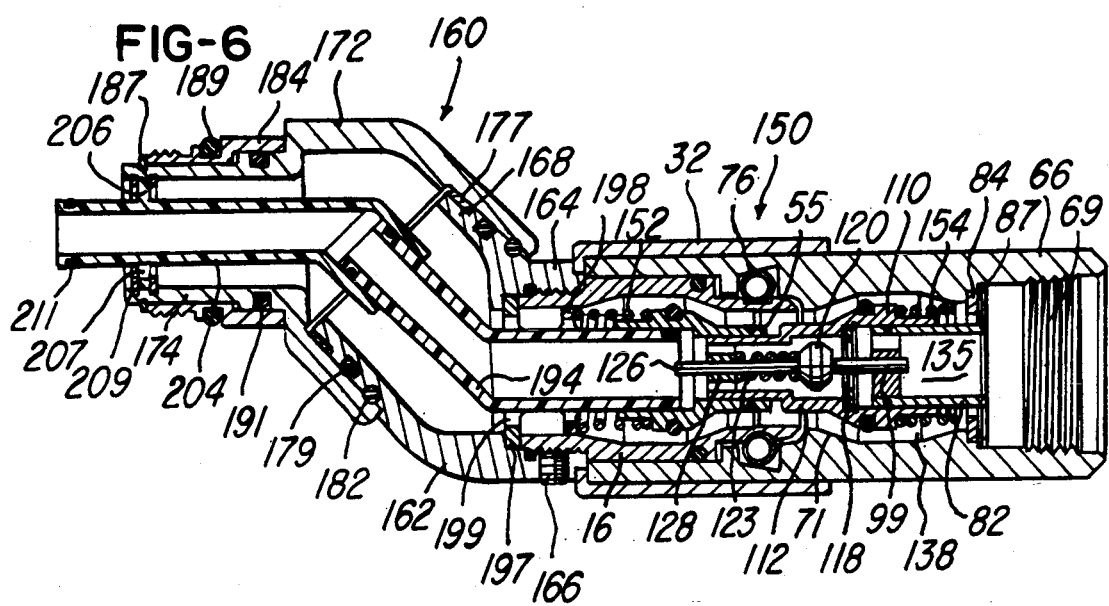

COAXIAL BREAKAWAY COUPLING WITH VAPOR ASSIST CHECK

BACKGROUND OF THE INVENTION

This invention relates to breakaway couplings for use with a coaxial fuel supply and vapor recovery hose and of the general type disclosed in U.S. Pat. No. 4,763,683 which issued to the assignee of the present invention. Other forms of such coaxial breakaway couplings are disclosed in U.S. Pat. Nos. 4,827,960 and 5,135,029. Such coaxial breakaway couplings are commonly used to connect one end of a flexible coaxial hose to a fuel dispensing pump. The opposite end of the hose is connected to a vapor recovery fuel dispensing nozzle, for example, of the type disclosed in U.S. Pat. No. 5,255,723 which also issued to the assignee of the present invention.

In one type of vapor recovery system, such as disclosed in U.S. Pat. No. 5,255,723, the inner conduit of the flexible coaxial hose is used to supply liquid fuel from the dispensing pump to the dispensing nozzle, and the annular passage defined between the inner conduit or tube and the outer conduit or tube is used for returning vapor displaced by fuel in a motor vehicle tank back through the dispensing pump to the underground fuel storage tank. In another type of vapor recovery system the inner conduit or tube within the coaxial hose is used for returning fuel vapor from the dispensing nozzle to the dispensing pump, and the annular outer passage surrounding the inner tube, is used for supplying liquid fuel from the dispensing pump to the dispensing nozzle. This system is commonly referred to as a vapor assist system since the dispensing pump housing encloses a vacuum pump for creating a suction within the inner conduit or tube for sucking fuel vapors through the dispensing nozzle back to the dispensing pump.

When a breakaway coupling is used with a coaxial hose in a vapor assist recovery system, it is desirable for the coupling to incorporate check valves in not only the annular fuel supply passage but also in the center vapor return passage. Thus in the event the sections of the coupling are separated, both the fuel supply passage and the vapor return passage extending from the dispensing pump are closed so that fuel does not exit, and air does not enter the vapor return passage. Such coaxial breakaway couplings for vapor assist recovery systems and which are reconnectable, are produced by Huskey Corporation and Richards Industries, Inc. and sold under the trademarks SAFE-T-BREAK and RICHARDS, respectively.

In some vapor assist recovery systems, the vapor return vacuum pump enclosed within the housing of the dispensing pump creates a substantial suction in the vapor return passage, for example, on the order of 5" Hg, and this suction continues after the sections of the breakaway coupling have separated. Thus with the above coaxial breakaway couplings for the vapor recovery assists systems, it is necessary to use a compression spring which exerts a substantial force for holding the valve within the vapor return passage closed after the breakaway coupling has separated. If the valve does not remain closed, air is sucked past the valve and through the vapor return passage, and the vapor recovery system becomes significantly less effective.

SUMMARY OF THE INVENTION

The present invention is directed to an improved coaxial breakaway coupling which is simple in construction and assembly and which prevents air from being sucked into the recovery system in the event there is a breakaway condition and the sections of the coupling separate. The breakaway coupling of the invention is also compact in design and, in accordance with the modification of the invention, is integrated with a coaxial swivel coupling which attaches to a coaxial dispensing nozzle.

In accordance with one embodiment of the invention, a set of tubular valve bodies are releasably connected by an annular canted coil spring. The spring connection permits the valve bodies to separate in response to a predetermined tens ion force and al so to be reconnected with a substantially lower compression force. Each of the valve bodies supports a concentric center support tube which slidably supports a tubular valve member for axial movement. The tubular valve members and corresponding support tubes define therein a vapor return passage, and an annular liquid fuel supply passage is defined between the tubular valve members and support tubes and the surrounding tubular valve bodies. The valve members carry external sealing rings for engaging corresponding tapered annular valve seats within the valve bodies when the bodies are separated. The tubular valve members also have interfitting portions which move the valve members to open positions against corresponding compression springs when the valve bodies are connected or coupled together.

The tubular valve member within the valve body connected to the fuel dispensing pump includes an annular valve seat. A check valve member is supported for axial movement upstream of the valve seat within the vapor return passage and is moved to an open position when the tubular valve bodies and the tubular valve members are coupled together. When the valve bodies are uncoupled in response to a predetermined tension force, the check valve member is moved by a compression spring against the valve seat within the vapor return passage and is pulled against the valve seat by the suction within the vapor return passage so that air is prevented from entering the vapor return passage after a breakaway. In another embodiment, the breakaway coupling of the invention is integrated with a 45° coaxial swivel coupling which connects directly to a coaxial fuel dispensing nozzle.

Other features and advantages of the invention will be apparent from the following description, the accompanying drawings and the appended claims.

BRIEF DESCRIPTION OF THE DRAWINGS

FIG. I is an axial section of a coaxial breakaway coupling constructed in accordance with the invention and shown in its coupled position;

FIG. 2 shows the coupling of FIG. 1 in its uncoupled position;

FIG. 3 is a radial section taken generally on the line 3—3 of FIG. 1;

FIG. 4 is a radial section taken generally on the line 4—4 of FIG. 2;

FIG. 5 is a radial section taken generally on the line 5—5 of FIG. 1; and

FIG. 6 is an axial section of a modified coaxial breakaway coupling similar to the coupling shown in FIG. 1

DESCRIPTION OF THE PREFERRED EMBODIMENTS

A coaxial breakaway coupling 10 includes interfitting sections 12 and 14 which are primarily constructed of aluminum castings. Section 12 includes a tubular valve body 16 which has one end portion 18 threaded into a tubular fitting 21 having internal threads 22 for receiving the fitting (not shown) on one end of a coaxial fuel supply hose of the general type disclosed in above mentioned U.S. Pat. No. 4,763,683. A resilient O-ring 24 forms a fluid-tight seal between the tubular body 16 and fitting 21, and an external groove is formed within the body 16 for receiving a resilient O-ring 27. A tubular sleeve 32 surrounds the valve body 16 and includes an inwardly projecting end flange 33 which is clamped between the fitting 21 and an external shoulder 34 on the valve body 16. After the fitting 21 is tightened on the valve body 16, a set screw 37 secures the assembled parts. As shown in FIG. 3, the sleeve 32 has a cylindrical outer surface and a generally hexagonal inner surface 39.

The tubular valve body 16 has an opposite reduced end portion 42 with an external circumferential groove 43, and the end portion 42 also has an internal frusto-conical or tapered valve seat 46. A center support tube 48 is positioned within the end portion 18 of the valve body 16 and has an outwardly projecting flange 49 positioned within a counterbore within the fitting 21 and secured by a spring retaining ring 51. The flange 49 has circumferentially spaced arcuate slots or passages 53 which define therebetween three uniformally spaced ribs.

A tubular valve member 55 is supported by the tube 48 for axial movement within the tubular valve body 16 and has an enlarged portion with a circumferential groove for receiving a resilient O-ring 57. The O-ring 57 forms a fluid-tight seal with the valve seat 46 in response to an axial force produced by a compression spring 59 extending between one end of the support tube 48 and an internal shoulder within the valve member 55. A resilient O-ring 62 forms a fluid-tight sliding seal between the support tube 48 and tubular valve member 55, and another resilient O-ring 64 is carried within an internal groove formed within the inner end portion of the valve member 55.

The coupling section 14 of the coaxial coupling 10 includes a tubular valve 66 which has a hexagonal outer surface 67 with rounded corners for mating with the inner surface 39 of the sleeve 32, as shown in FIG. 3. The outer end portion of the valve body 66 has internal threads 69 for receiving the fitting on one end of a short flexible coaxial hose (not shown) having an opposite end connected to the fuel dispensing pump. The tubular valve body 66 also has a frusto-conical or tapered valve seat 71 and an internal tapered groove 73 within a bore 74 which is sized to receive the end portion 42 of the tubular valve body 16, as shown in FIG. 1.

An annular canted coil spring 76, for example, of the type disclosed in U.S. Pat. No. 4,655,462, is confined within the groove 73 and is expanded slightly by the end portion 42 of the valve body 16 until the spring 76 snaps into the external groove 43 within the valve body 16, as shown in FIG. 1, when the coupling sections 12 and 14 are pressed axially together to a connected or coupled position. The canted coil spring 76 and the tapered surfaces of the grooves 73 and 43 are selected to provide for separation of the coupling sections 12 and 14 with a predetermined tension force and the recoupling of the sections with a substantially lower axial or compression force.

A support tube 82 is supported concentrically within the valve body 66 by a flange portion 84 seated within a counterbore within the valve body 66 and secured by a spring retaining ring 87. The flange portion 84 has peripherally spaced arcuate slots or passages 89 defined between three uniformally spaced ribs which integrally connect the support tube 82 and flange 84. The inner end portion of the tube 84 has a peripheral groove for receiving a resilient O-ring 92, and a hub 94 with three outwardly projecting and uniformally spaced ribs, is pressed into the inner end portion of the support tube 82. The ribs define three arcuate slots or passages 97 between the ribs. The hub 94 receives the threaded end portion of an axially extending pin 99.

A tubular poppet valve member 110 is supported by the tube 82 for axial sliding movement and has an enlarged annular portion 112 with a peripheral groove receiving a resilient O-ring 113. A compression spring 115 extends between the end and the support tube 82 and an internal annular shoulder within the valve member 110 and urges the valve member and 0-ping 113 against the tapered annular seat 71 within the valve body 66. The compression spring 115 also retains an annular valve seat 118 in the form of a resilient gasket and back-up washer engaging the spring. The gasket is pressed against an annular shoulder within the tubular valve member 110.

A check valve member 120, having tapered opposite end portions, is positioned concentrically within the enlarged portion 112 of the valve member 110 and is urged against the annular seat 118 by a compression spring 123 surrounding a cylindrical pin 126. The pin 126 and check valve 120 are supported for axial movement as a unit by a hub member 128 having three outwardly projecting and circumferentially spaced ribs which are pressed into the inner cylindrical end portion of the tubular valve member 110.

When the coupler sections 12 and 14 are snapped together in the coupled position shown in FIG. 1, the support tubes 48 and 82 and the tubular poppet valve members 55 and 110 define a vapor return passage 135 in which the fuel vapor flows from left to right in FIG. 1 to a vacuum pump (not shown) located within the housing of a fuel dispensing pump. Liquid fuel is supplied from the dispensing pump through the coupler from right to left in FIG. 1 through an annular passage 138 defined within the tubular valve bodies 16 and 66 and around the inner support tubes 48 and 82 and tubular valve members 55 and 110.

When the coupling sections 12 and 14 are assembled together, as shown in FIG. 1, the interfitting connection of the tubular valve members 55 and 110 moves the valve members to their retracted open positions so that liquid fuel is free to flow through the coupling within the annular passage 138. As also shown in FIG. 1, when the coupler sections 12 and 14 are coupled together, the pin 99 depresses the check valve member 120 to an open position retracted from the annular seat 118 so that return vapor is free to be sucked through the passage 135 by the vacuum pump.

As shown in FIG. 2, when the coupling sections 12 and 14 separate, under a breakaway condition, the tubular valve members 55 and 110 close, and the check valve member 120 closes against the annular resilient gasket forming the seat 118. As a result of the upstream position of the check valve member 120 relative to the annular seat 118 within the tubular valve member 110, the continued suction within the vapor return passage 135 from the vacuum pump, is effective to pull the check valve member 120 tighter against the annular seat 118 to insure that no air is sucked past the check valve member 120 and into the vapor return passage and system.

Referring to FIG. 6, a coaxial breakaway coupling 150 is constructed substantially the same as the coupling 10 except with a shorter length. Accordingly, the same reference numbers are used to identify the same corresponding parts or components. In order to obtain a shorter length, the compression springs 59 and 115 are replaced by compression springs 152 and 154, respectively, which extend around the corresponding support tubes 48 and 82 instead of within the support tubes for urging the tubular valve members 55 and 110 towards their closed positions.

The coaxial breakaway coupling 150 is integrated with a 45° swivel connection or coupling 160. In place of the tubular fitting 21, a 45° tubular fitting 162 has an end portion 164 which is threaded onto the end portion 18 of the valve body 16 and is secured by a set screw 166. The fitting 162 has an opposite cylindrical end portion 168 which rotatably supports a surrounding end portion of a 45° tubular fitting 172 which has a cylindrical end portion 174. A cylindrical metal wear bushing 177 is confined within an external groove within the end portion 168 of the fitting 162 and engages the fitting 172, and a resilient O-ring 179 forms a fluid-tight seal between the fittings 162 and 172. A set of opposing annular grooves are formed within the fittings 162 and 172 and have a tangential inlet for receiving an elongated flexible nylon cord 182 or a continuous series of ball bearings for securing the fittings 162 and 172 together.

A tubular hexagonal nut 184 is mounted on the end portion 174 of the fitting 172 and is retained for relative rotation by a retaining ring 187. A resilient O-ring 189 is carried by an external groove within the nut 184 and forms a fluid-tight seal between the nut and the inlet end of a fuel dispensing nozzle (not shown). Another resilient O-ring 191 forms a fluid-tight seal between the fitting 172 and the nut 184.

A 45° center support tube 194 is molded of a rigid plastics material that includes a set of axially spaced and outwardly projecting peripheral flanges 197 and 198 which support the tube 194 concentrically within the tubular valve body 16 in the same manner as the support tube 48 is supported within the valve body 16 by the flange 49. Circumferentially spaced arcuate slots or passages 199 are formed within the flanges 197 and 198 to form extensions of the liquid fuel supply passage 138. The angular support tube 194 forms an extension of the vapor return passage 135 and rotably supports one end portion of a 45° tube 204 which is positioned concentrically within the fitting 172 and forms a further extension of the vapor return passage 135. The tube 204 is also molded of a rigid plastics material and includes an outwardly projecting integral flange 206 with circumferentially spaced arcuate slots or passages 207 forming an extension of the fuel supply passage 138. A pair of spring retaining rings 209 secure the flange 206 and center tube 204 within the fitting 172, and the outer end portion of the tube 204 carries a resilient O-ring 211 for forming a fluid-tight seal with a surrounding tube within the dispensing nozzle and to form a continuation of the vapor return passage 135.

From the drawings and the above description, it is apparent that a coaxial breakaway coupling 10 or 150 constructed in accordance with the present invention provides novel features and advantages and may also be integrated with a swivel coupling 160 to provide additional advantages. For example, the coaxial breakaway coupling 10 or 150 is easy and economical to produce and provides for automatically closing the liquid fuel supply passage in both coupling sections 12 and 14 and for automatically closing the vapor return passage within the section 14 in the event the sections of the coupling are separated in response to a predetermined tension force on the coaxial fuel supply nozzle and flexible coaxial hose. In addition, the continued suction within the vapor return passage 135 within the coupling section 14 pulls the check valve member 120 firmly against the annular valve seat 118 to assure that no air is sucked into the vapor recovery system when the coupling sections are separated. The mating inner surface 39 of the sleeve 32 and the outer surface 67 of the valve body 66 also prevent relative rotation between the coupling sections 12 and 14 when they are coupled together so that the canted coil spring 76 functions to provide the desired tension force for separation of the coupling sections and the substantially lower compression force for reconnecting the coupling sections. As shown in FIG. 6, the coaxial breakaway coupling 150 is also combined with the swivel coupling 160 to provide a compact assembly and universal relative movement between the coaxial fuel dispensing nozzle and the coaxial fuel supply and vapor return hose.

While the forms of coupling herein described constitute preferred embodiments of the invention, it is to be understood that the invention is not limited to these precise forms of coupling, and that changes may be made therein without departing from the scope and spirit of the invention as defined in the appended claims.

The invention having thus been described, the following is claimed:

1. A breakaway coupling for use with a flexible coaxial fuel supply hose defining a vapor return passage surrounded by a liquid fuel supply passage, said coupling comprising a first tubular valve body and a second tubular valve body disposed with a common center axis, means for releasably connecting said valve bodies and providing for movement of said valve bodies from a connected position to a disconnected position in response to an axial tension force, each of said valve bodies having an axially extending support tube defining therein an inner vapor return passage and cooperating with the surrounding said valve body to define therebetween an axially extending outer liquid fuel supply passage, a tubular valve member supported by each of said support tubes for axial movement, each of said valve bodies including means forming an annular valve seat within the corresponding fuel supply passage, means for moving each of said valve members axially on the corresponding said support tube from a closed position engaging the corresponding said valve seat to an open position retracted axially from said valve seat in response to movement of said valve bodies from said disconnected position to said connected position, spring means for urging each of said valve members towards said closed position, at least one of said tubular valve members including means forming an annular check valve seat within the corresponding said vapor return passage, a check valve member supported for axial movement within said vapor return passage of said one valve member upstream of said valve seat with respect to the flow of vapor, means for holding said check valve member in an open position spaced from said check valve seat when said valve bodies are in said connected position, and said check valve member being pulled to a closed position against said check valve seat in response to suction within said vapor return passage downstream of said check valve member when said valve bodies are in said disconnected position.

2. A coupling as defined in claim 1 wherein said check valve member comprises a head portion having a tapered annular surface for engaging said annular seat within said vapor return passage, a valve stem extending axially upstream within said vapor return passage from said head portion, and a hub member spaced within said vapor return passage of said one valve member and supporting said stem for axial movement.

3. A coupling as defined in claim 1 wherein each of said support tubes includes an outwardly projecting flange within said fuel supply passage, and said flange defines a plurality of arcuate passages providing for the flow of fuel.

4. A coupling as defined in cl aim 1 where in said means for holding said check valve member in said open position comprise an axially extending pin supported within the center of said support tube and positioned to engage said check valve member when said one valve member moves axially on the corresponding said support tube to said open position.

5. A coupling as defined in claim 1 wherein said means for moving said tubular valve members comprise interfitting tubular end portions on said valve members, and means forming a fluid-tight seal between said tubular end portions.

6. A coupling as defined in claim 1 wherein said means for releasably connecting said valve bodies comprise a set of opposing annular grooves within said valve bodies, and an annular canted coil spring within said grooves.

7. A coupling as defined in claim 1 wherein said first tubular valve body includes a tubular sleeve surrounding said valve body and having a non-cylindrical inner surface, and said second valve body has a mating non-cylindrical outer surface engaging said inner surface and preventing relative rotation between said valve bodies on said center axis.

8. A coupling as defined in claim 1 in combination with a swivel coupling including a set of angular fittings, means connecting said fittings for relative rotation on an axis forming an acute angle with said center axis, one of said fittings connected to said first tubular valve body, said support tube within said first valve body including an angular extension tube within the center of said one fitting and defining a continuation of said vapor return passage, and a center tube within the other said fitting and having an end portion rotatably connected to said extension tube.

9. A breakaway coupling for use with a flexible coaxial fuel supply hose defining a vapor return passage surrounded by a liquid fuel supply passage, said coupling comprising a first tubular valve body and a second tubular valve body disposed with a common center axis, means for releasably connecting said valve bodies and providing for movement of said valve bodies from a connected position to a disconnected position in response to an axial tension force, each of said valve bodies having an axially extending support tube defining therein an inner vapor return passage and cooperating with the surrounding said valve body to define therebetween an axially extending outer liquid fuel supply passage, a tubular valve member supported by each of said support tubes for axial movement, each of said valve bodies including means forming an annular valve seat within the corresponding fuel supply passage, spring means for moving each of said valve members axially on the corresponding said support tube from an open position retracted axially from said valve seat to a closed position engaging the corresponding said valve seat in response to movement of said valve bodies between said connected position to said disconnected position, at least one of said tubular valve members including means forming an annular check valve seat within the corresponding said vapor return passage, a check valve member supported for axial movement within said vapor return passage of said one valve member upstream of said valve seat with respect to the flow of vapor, spring means for urging each of said check valve member towards said check valve seat, means supported by said support tube within said one valve member for holding said check valve member in an open position spaced from said check valve seat when said valve bodies are in said connected position, and said check valve member being pulled to a closed position against said check valve seat in response to suction within said vapor return passage downstream of said check valve seat when said valve bodies are in said disconnected position.

10. A coupling as defined in claim 9 wherein said check valve member comprises a head portion having a tapered annular surface for engaging said annular check valve seat within said vapor return passage, a valve stem extending axially upstream within said vapor return passage from said head portion, and a hub member spaced within said vapor return passage of said one valve member and supporting said stem for axial movement.

11. A coupling as defined in claim 9 where in each of said support tubes includes an outwardly projecting flange within said fuel supply passage, and said flange defines a plurality of arcuate passages providing for the flow of fuel.

12. A coupling as defined in claim 9 wherein said means for holding said check valve member in said open position comprise an axially extending pin supported by the corresponding said support tube and positioned to engage said check valve member when said one valve member moves axially on the corresponding said support tube to said open position.

13. A coupling as defined in claim 9 wherein said tubular valve members comprise opposite and interfitting tubular end portions when said valve bodies are in said connected position, and means forming a fluid-tight seal between said tubular end portions.

14. A coupling as defined in claim 9 wherein said means for releasably connecting said valve bodies comprise a set of opposing annular grooves within said valve bodies, and an annular canted coil spring within said grooves.

15. A coupling as defined in claim 9 wherein said first tubular valve body includes a tubular sleeve surrounding said valve body and having a non-cylindrical inner surface, and said second valve body has a mating non-cylindrical outer surface engaging said inner surface and preventing relative rotation between said valve bodies on said center axis.

* * * * *